(12) United States Patent
Fujiki et al.

(10) Patent No.: US 8,487,032 B2
(45) Date of Patent: Jul. 16, 2013

(54) RUBBER COMPOSITION AND TIRE USING SAME

(75) Inventors: Kumi Fujiki, Tokyo (JP); Kazuhiro Maekawa, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/260,026

(22) PCT Filed: Mar. 30, 2010

(86) PCT No.: PCT/JP2010/055755
§ 371 (c)(1),
(2), (4) Date: Nov. 9, 2011

(87) PCT Pub. No.: WO2010/113973
PCT Pub. Date: Oct. 7, 2010

(65) Prior Publication Data
US 2012/0101211 A1    Apr. 26, 2012

(30) Foreign Application Priority Data

Mar. 30, 2009  (JP) .................. 2009-082919
Feb. 26, 2010  (JP) .................. 2010-042201

(51) Int. Cl.
*B60C 1/00* (2006.01)
(52) U.S. Cl.
USPC ........................................ 524/492
(58) Field of Classification Search
USPC ........................................ 524/492
See application file for complete search history.

(56) References Cited

U.S. PATENT DOCUMENTS 4,942,192 A * 7/1990 Yasuda et al. .................. 524/44
6,186,202 B1 * 2/2001 Majumdar et al. ......... 152/209.6

FOREIGN PATENT DOCUMENTS

| JP | 49-18792 B | * | 5/1974 |
| JP | 57-057734 A | * | 4/1982 |
| JP | 04-126759 A | | 4/1992 |
| JP | 2002-105249 A | | 4/2002 |
| JP | 2002-327159 A | | 11/2002 |
| JP | 2003-026859 A | | 1/2003 |
| JP | 2006-117927 A | | 5/2006 |
| JP | 2006-342262 A | | 12/2006 |
| JP | 2007-031638 A | | 2/2007 |
| JP | 2007-211088 A | | 8/2007 |

OTHER PUBLICATIONS

English Translation of JP 57-057734 A by The McElroy Translation Company. Aug. 2012.*
Organic Chemistry of Macromolecules an Introductory Textbook. A. Ravve. 1967. Marcel Dekker, Inc. New York. p. 313-314.*

* cited by examiner

*Primary Examiner* — Ling Choi
*Assistant Examiner* — Lanee Reuther
(74) *Attorney, Agent, or Firm* — Sughrue Mion, PLLC

(57) ABSTRACT

Provided is a rubber composition that comprises a rubber component of at least one of natural rubber and synthetic rubber and a resin composition containing a novolak-type resorcin resin and a resol-type phenolic resin in which the content of the dimethylene ether group is within a specific range. Not using hexamethylenetetramine or hexamethoxymethylmelamine as a curing agent, the curability and the thermal stability of the resin composition have been enhanced; and the rubber composition has characteristics of high elasticity, large elongation at breakage and low heat generation. Also provided is a tire which comprises the rubber composition in the tire bead part thereof and, therefore, has improved durability in use thereof while concerning for the environmental safety.

10 Claims, 1 Drawing Sheet

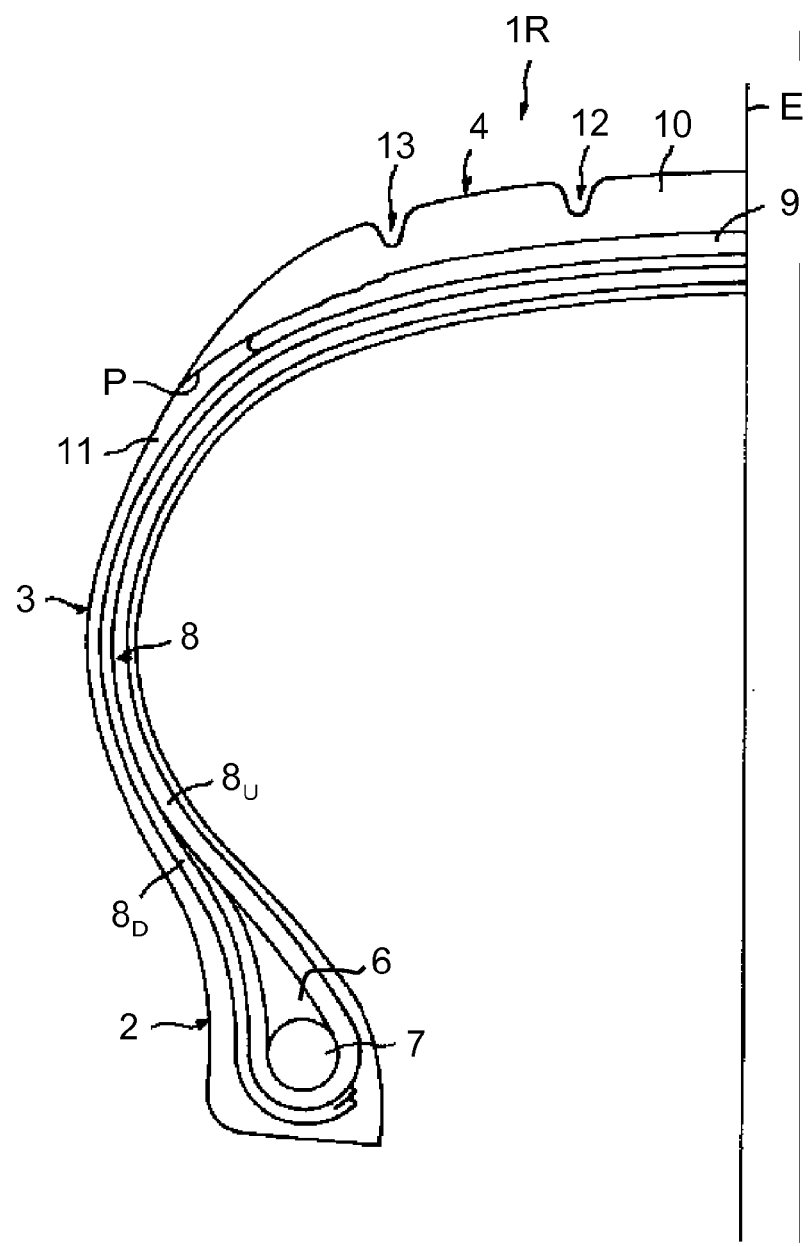

RUBBER COMPOSITION AND TIRE USING SAME

CROSS REFERENCE TO RELATED APPLICATIONS

This application is a National Stage of International Application No. PCT/JP2010/055755, filed on Mar. 30, 2010, which claims priority from Japanese Patent Application Nos. 2009-082919, filed on Mar. 30, 2009 and JP 2010-042201, filed Feb. 26, 2010, the contents of all of which are incorporated herein by reference in their entirety.

TECHNICAL FIELD

The present invention relates to a rubber composition and a tire, and relates to a rubber composition favorable for use as the carcass part of a tire, especially as the bead filler rubber thereof, and to a tire using the rubber composition and excellent in durability.

BACKGROUND ART

Heretofore, highly-elastic rubber is used for the carcass part and the like of a tire. As a means of enhancing the elasticity of rubber, there is disclosed a method of increasing the amount of the filler such as carbon black or the like, for example, in Patent Reference 1, and there is also known a method of increasing the amount of sulfur in the vulcanizing agent to thereby increase the crosslinking point, etc.; however, the case of increasing the amount of the filler such as carbon black or the like is problematic in that the factory workability of the rubber composition as well as the resistance to fracture such as the elongation at breakage or the like thereof may worsen and the heat generation of the rubber composition may increase. In addition, the case of increasing the amount of sulfur in the vulcanizing agent is also problematic in that the elongation at breakage may lower and the physical change owing to thermal degradation may increase.

In this connection, as a means of enhancing the elasticity of a rubber composition with suppressing the reduction in the elongation at breakage thereof, there is disclosed a method of adding thereto an unmodified novolak-type phenolic resin to be obtained through condensation of a phenol and an aldehyde in the presence of an acid catalyst, or a modified novolak-type phenolic resin that has been modified with an unsaturated oil such as tall oil, cashew oil or the like or with an aromatic hydrocarbon such as xylene, mesitylene or the like, and hexamethylenetetramine as a curing agent capable of curing the resin, for example, in Patent References 2 and 3.

Patent Reference 4 proposes a method of using a resol-type phenolic resin in place of the above-mentioned hexamethylenetetramine as the curing agent for the novolak-type phenolic resin to be added to rubber for the purpose of improving the processing safety of the rubber composition.

Patent Reference 1: JP-A 9-272307
Patent Reference 2: JP-A 5-98081
Patent Reference 3: JP-A 2001-226528
Patent Reference 4: JP-A 57-57734

DISCLOSURE OF THE INVENTION

Problems that the Invention is to Solve

However, in the method described in Patent References 2 and 3, hexamethylenetetramine and hexamethoxymethylmelamine generally used as the curing agent generate a volatile gas such as ammonium gas, formaldehyde or the like when heated at the decomposition temperature thereof or higher during kneading or in the vulcanization step. In the case of rubber parts such as tires that contain steel cords or organic fiber cords, ammonium gas causes reduction in the adhesiveness between rubber and the cord. In addition, since hexamethylenetetramine serves also as a vulcanization promoter for rubber, it has a drawback in that, when its amount added is large, then rubber may readily scorch.

Regarding formaldehyde, its concentration in the indoor air is defined to be not higher than the specified level in the field of factories from the viewpoint of the environmental safety therein, and anyone must work to make the concentration not higher than the level.

For these reasons, when hexamethylenetetramine or hexamethoxymethylmelamine is used as the curing agent, there are constrains on its amount to be added and the part to which it is added.

Further, in the method described in Patent Reference 4, a resol-type phenolic resin is used as the curing agent; however, since the resol-type phenolic resin is produced through polymerization of a phenol and a formaldehyde in the presence of an alkali catalyst according to an ordinary method, the phenolic moieties in the obtained resin are almost bonded with a methylene group (in which the dimethylene ether content is at most 10 mol %). Accordingly, the method could solve the above-mentioned problems; however, when the obtained rubber composition is used for tires, its strength at breakage is not sufficient and in case where the rubber composition is used in the bead part, the composition could not satisfy the durability in using tires since the adhesiveness thereof to cords is insufficient.

The present invention has been made in consideration of the situation as above, and one object thereof is to provide a rubber composition capable of enhancing the curability of the resin composition therein without using hexamethylenetetramine or hexamethoxymethylmelamine as the curing agent, capable of increasing the thermal stability thereof, and having characteristics of high elasticity, large elongation at breakage and low heat generation. Another object is to provide a tire which comprises the rubber composition in the tire bead part thereof and, therefore, has improved durability in use thereof while concerning for the environmental safety.

Means for Solving the Problems

The above-mentioned problems can be solved by the present invention described below.

Specifically, the invention of claim 1 of the present invention is a rubber composition that comprises a rubber component of at least one of natural rubber and synthetic rubber, and a resin composition containing a novolak-type resorcin resin and a resol-type phenolic resin, wherein the content of the dimethylene ether group in the resol-type phenolic resin is from 20 mol % to 100 mol % relative to the content of the total bonding groups derived from the aldehydes that bond the phenol-derived aromatic rings to each other.

The invention of claim 2 is the rubber composition according to claim 1, wherein the novolak-type resorcin resin is prepared by reacting a resorcin and an aldehyde in a molar ratio (aldehyde/resorcin) of from 0.4 to 0.8.

The invention of claim 3 is the rubber composition according to claim 1 or 2, wherein the content of the novolak-type resorcin resin in the resin composition is from 18% by mass to 50% by mass.

The invention of claim 4 is the rubber composition according to any of claims 1 to 3, wherein the content of the resin composition is from 1 part by mass to 30 parts by mass relative to 100 parts by mass of the rubber component.

The invention of claim 5 is the rubber composition according to any of claims 1 to 4, wherein the resin composition previously contains a filler.

The invention of claim 6 is the rubber composition according to claim 5, wherein the content of the filler is from 1 part by mass to 100 parts by mass relative to 100 parts by mass of the resin composition.

The invention of claim 7 is the rubber composition according to claim 5 or 6, wherein the filler is fumed silica.

The invention of claim 8 is the rubber composition according to any of claims 1 to 7, wherein the rubber component is a dienic rubber.

The invention of claim 9 is a tire wherein the bead part comprises a rubber composition in at least a part thereof and wherein the rubber composition is the rubber composition according to any of claims 1 to 8.

The invention of claim 10 is the tire according to claim 9, wherein the bead part comprising the rubber composition is a bead filler.

The invention of claim 11 is the tire according to claim 9 or 10, wherein the rubber composition contains carbon black and the carbon black content is from 30 parts by mass to 100 parts by mass relative to 100 parts by mass of the rubber component.

ADVANTAGE OF THE INVENTION

According to the invention of claim 1 of the present invention, the curability and the thermal stability of the resin composition can be enhanced without using hexamethylenetetramine or hexamethoxymethylmelamine as the curing agent, and a rubber composition having characteristics of high elasticity and large elongation at breakage can be obtained.

According to the invention of claim 2, the reaction control in curing the resin composition is easy, and a rubber composition excellent in handlability and mechanical characteristics can be obtained.

According to the invention of claim 3, the curability of the resin composition can be enhanced, and a rubber composition having characteristics of high elasticity and low heat generation can be obtained.

According to the invention of claim 4, a rubber composition having characteristics of high elasticity and large elongation at breakage can be obtained.

According to the invention of claim 5, the resistance to blocking, which may occur when the resin composition is left as it is for a while, of the rubber composition can be improved, not detracting from the modulus of elasticity and the elongation at breakage of the rubber composition.

According to the invention of claim 6, the resistance to blocking, which may occur when the resin composition is left as it is for a while, of the rubber composition can be improved, not detracting from the modulus of elasticity and the elongation at breakage of the rubber composition.

According to the invention of claim 7, the resistance to blocking, which may occur when the resin composition is left as it is for a while, of the rubber composition can be improved, not detracting from the modulus of elasticity and the elongation at breakage of the rubber composition.

According to the invention of claim 8, a rubber composition having characteristics of higher elasticity and larger elongation at breakage can be obtained.

According to the invention of claim 9, the rubber composition, which can be obtained without using hexamethylenetetramine or hexamethoxymethylmelamine as the curing agent and which has characteristics of high elasticity, large elongation at breakage and low heat generation, is used as the bead part of a tire, and therefore the tire has improved durability in use thereof while concerning for the environmental safety.

According to the invention of claim 10, the rubber composition can effectively exhibit the adhesiveness thereof to cords and the high elasticity thereof, thereby effectively enhancing the durability of the entire tire.

According to the invention of claim 11, the modulus of elasticity can be efficiently enhanced not detracting from the adhesiveness to cords.

BRIEF DESCRIPTION OF THE DRAWING

FIG. 1 This is a left-half cross-sectional view of one example of the tire of the present invention.

BEST MODE FOR CARRYING OUT THE INVENTION

The present invention is described below with reference to the embodiments thereof.

<Rubber Composition>

The rubber composition of this embodiment comprises a rubber component of at least one of natural rubber and synthetic rubber, and a resin composition containing, as the indispensable ingredients thereof, a novolak-type resorcin resin and a resol-type phenolic resin, wherein the content of the dimethylene ether group in the resol-type phenolic resin is from 20 mol % to 100 mol % relative to the content of the total bonding groups derived from the aldehydes that bond the phenol-derived aromatic rings to each other.

(Rubber Component)

The rubber component usable in the rubber composition of this embodiment is at least one selected from natural rubber (NR) and various types of synthetic rubbers. Specific examples of the synthetic rubbers include polyisoprene rubber (IR), styrene-butadiene copolymer rubber (SBR), polybutadiene rubber (BR), butyl rubber (IIR), halogenated butyl rubber (Br-IIR, Cl-IIR), ethylene-propylene-diene rubber (EPDM), crosslinked polyethylene rubber, chloroprene rubber, nitrile rubber, etc. One alone or two or more of these rubber components may be used here either singly or as combined. Using any of these can bring about the advantages peculiar to this embodiment in that the rubber composition can exhibit high elasticity and large elongation at breakage owing to the curing of the phenolic resin composition therein to be mentioned below.

Of the above, preferred is use of natural rubber (NR) and dienic rubbers such as styrene-butadiene copolymer rubber (SBR), polybutadiene rubber (BR) and the like, as giving a rubber composition having characteristics of higher elasticity and larger elongation at breakage.

(Resin Composition)

The rubber composition of this embodiment contains a resin composition that comprises, as the essential ingredients thereof, a novolak-type resorcin resin and a resol-type phenolic resin. Incorporating the phenolic resin composition of a thermoplastic resin capable of increasing the modulus of elasticity of the rubber composition is effective; however, the novolak-type resorcin resin alone could not cure in the absence of a curing agent since the resin does not have a methylol group at the terminal thereof. On the other hand, as having a methylol group at the terminal thereof, the resol-type phenolic resin can cure even in the absence of a curing agent. However, when alone, the curability of the resol-type phenolic resin is poor, and the resin could not cure sufficiently during vulcanization of rubber.

Therefore, in this embodiment, the present inventors have found that, when a novolak-type resorcin resin and a resol-type phenolic resin are incorporated in the resin composition, then the modulus of elasticity of the rubber composition can be increased without using a curing agent, and the elongation at breakage thereof can also be increased. Specifically, it is considered that the combined use of the novolak-type resorcin resin and the resol-type phenolic resin brings about a highly bulky resin composition in which the resol-type phenolic resin and the novolak-type resorcin resin react with each other, and the bulky resin composition could effectively act as the pseudo-crosslinked structure in the rubber component to thereby increase the elasticity and the elongation at breakage of the rubber composition.

In this embodiment, the above-mentioned "phenolic resin" is meant to indicate a wide-ranging phenolic resin that includes not only polycondensates starting from phenol alone but also polycondensates starting from all other phenols such as cresol, xylenol, etc.

The resol-type phenolic resin for use in this embodiment is produced through reaction of a phenol and an aldehyde. In fact, the resol-type phenolic resin is known as a precursor thereof before curing, but when an alkali catalyst is sued in the reaction, then addition reaction would go on mainly to give a resol-type phenolic resin having a low degree of polymerization.

The phenol for use in the resol-type phenolic resin in this embodiment includes, for example, phenol; cresols such as o-cresol, m-cresol, p-cresol, etc.; xylenols such as 2,3-xylenol, 2,4-xylenol, 2,5-xylenol, 2,6-xylenol, 3,4-xylenol, 3,5-xylenol, etc.; ethylphenols such as o-ethylphenol, m-ethylphenol, p-ethylphenol, etc.; isopropylphenol; butylphenols such as butylphenol, p-tert-butylphenol, etc.; alkylphenols such as p-tert-amylphenol, p-octylphenol, p-nonylphenol, p-cumylphenol, etc.; halogenophenols such as fluorophenol, chlorophenol, bromophenol, iodophenol, etc.; substituted monophenols such as p-phenylphenol, aminophenol, nitrophenol, dinitrophenol, trinitrophenol, etc.; as well as monophenols such as 1-naphthol, 2-naphthol, etc.; and polyphenols such as resorcin, alkylresorcin, pyrogallol, catechol, alkylcatechol, hydroquinone, alkylhydroquinone, phloroglucine, bisphenol A, bisphenol F, bisphenol S, dihydroxynaphthalene, etc. One alone or two or more of these may be used either singly or as combined.

Of those phenols, preferred is one selected from phenol, cresols and bisphenol A that are economically advantageous.

The aldehyde for use in the resol-type phenolic resin and the novolak-type resorcin resin in this embodiment includes, for example, formaldehyde, paraformaldehyde, trioxane, acetaldehyde, propionaldehyde, polyoxymethylene, chloral, hexamethylenetetramine, furfural, glyoxal, n-butylaldehyde, caproaldehyde, allylaldehyde, benzaldehyde, crotonaldehyde, acrolein, tetraoxymethylene, phenylacetaldehyde, o-tolaldehyde, salicylaldehyde, etc. One alone or two or more of these may be used either singly or as combined.

Of those aldehydes, preferred is one selected from formaldehyde and paraformaldehyde that are excellent in reactivity and are inexpensive.

The resol-type phenolic resin may be produced through reaction of the above-mentioned phenol and aldehyde in the presence of a catalyst such as alkali metals, amines, divalent metal salts, etc.

As the catalyst for use in the reaction, for example, usable are alkali metal hydroxides such as sodium hydroxide, lithium hydroxide, potassium hydroxide, etc.; oxides and hydroxides of alkaline earth metals such as calcium, magnesium, barium, etc.; sodium carbonate; aqueous ammonia; amines such as triethylamine, hexamethylenetetramine, etc.; divalent metal salts such as magnesium acetate, zinc acetate, etc. One alone or two or more of these substances may be used here either singly or as combined.

In production of the resol-type phenolic resin, the reaction molar ratio of the phenol and the aldehyde is preferably such that the content of the aldehyde is from 0.80 mols to 2.50 mols, more preferably from 1.00 mol to 2.30 mols relative to 1 mol of the phenol. When the molar ratio falls within the above range, then the reaction control is easy and the resol-type phenolic resin can be surely obtained.

The content of the dimethylene ether group in the resol-type phenolic resin for use in this embodiment is from 20 mol % to 100 mol % relative to the content of the total bonding groups derived from the aldehydes that bond the phenol-derived aromatic rings to each other, preferably from 20 mol % to 80 mol %, more preferably from 25 mol % to 75 mol %, still more preferably from 35 mol % to 60 mol %. When the content of the dimethylene ether group falls within the above range, then a phenolic resin composition having good curability and excellent thermal stability and free from quality variation can be obtained.

The proportion of bonding groups in the resol-type phenolic resin is determined through 1H-NMR. Concretely, the resol-type phenolic resin is processed with acetic anhydride in a pyridine catalyst to thereby acetylate the methylol group therein, and the acetylated resin is analyzed through 1H-NMR.

The content of each bonding group is determined, based on the peak (2.04 ppm) of acetone in the measured spectrum, as the methylene group (about 3.8 ppm), the dimethylene ether group (about 4.5 ppm), and the methylol group (about 5.0 ppm). The integral intensity ratio of the peak is halved (divided in ½ times) for the methylene group and the methylol group, and the integral intensity ratio for the dimethylene ether is divided in ¼ times; and from the ratio of those values, the proportion (mol %) of the content of the dimethylene ether group to the content of all the bonding groups derived from the aldehydes (sum of the content of the methylene group, the content of the dimethylene ether group and the content of the methylol group) is computed.

As the apparatus, herein used is JEOL's NMR analyzer "JNM-AL300" (frequency: 300 MHz). In the above-mentioned measurement method, phenol and formaldehyde are used as the starting materials for the resol-type phenolic resin; however, in other cases where other phenols and aldehydes than those are used, the intended proportion can be determined basically on the basis of the same principle.

On the other hand, the resorcins for use in the novolak-type resorcin resin include, for example, resorcin; methylresorcins such as 2-methylresorcin, 5-methylresorcin, 2,5-dimethylresorcin, etc.; 4-ethylresorcin, 4-chlororesorcin, 2-nitroresorcin, 4-bromoresorcin, 4-n-hexylresorcin, etc. One alone or two or more of these may be used either singly or as combined.

Of those resorcins, preferred is one selected from resorcin and methylresorcins that are economically advantageous.

The novolak-type resorcin resin may be produced by reacting resorcin and the above-mentioned aldehyde in the presence of an acid catalyst and then removing water in a water-removing step. As the catalyst for use in producing the novolak-type resorcin resin, there are mentioned acids such as oxalic acid, hydrochloric acid, sulfuric acid, diethyl sulfate, paratoluenesulfonic acid or the like; and one alone or two or more of these may be used either singly or as combined. Since resorcin is acidic by itself, and the resin can be produced in the presence of no catalyst.

In producing the novolak-type resorcin resin, the reaction molar ratio of resorcin and the aldehyde (aldehyde compound/resorcin) is preferably such that the amount of the aldehyde is from 0.40 mols to 0.80 mols per mol of resorcin, more preferably the amount of the aldehyde is from 0.45 mols to 0.75 mols. When the molar ratio falls within the range, it may be easy to control the reaction and to handle the resin.

The content of the novolak-type resorcin resin in the resin composition is preferably from 18% by mass to 50% by mass relative to the total resin composition, more preferably from 20% by mass to 45% by mass.

When the content of the novolak-type resorcin resin falls within the above range, the curability of the resin component in this embodiment may be enhanced and a rubber composition having characteristics of high elasticity and low heat generation can be obtained.

To the resin composition in this embodiment, a filler may be previously added for enhancing the resistance thereof to blocking, which may occur when the resin composition is left as it is for a while. Various types of fillers may be used here. For example, there may be mentioned calcium carbonate, calcium stearate, silica, barium sulfate, talc, clay, graphite, etc.; and one alone or two or more of these may be used here either singly or as combined. Of those, use of silica is preferred, and more preferred is fumed silica not detracting from the physical properties of the rubber composition.

Regarding the amount of the filler to be added, preferably, the filler is added in an amount of from 1 part by mass to 100 parts by mass relative to 100 parts by mass of the resin composition. When the content falls within the range, the resistance to blocking, which may occur when the resin composition is left as it is for a while, of the rubber composition can be improved, not detracting from the modulus of elasticity and the elongation at breakage of the rubber composition. More preferably, the content is from 5 parts by mass to 90 parts by mass, even more preferably from 30 parts by mass to 80 parts by mass, still more preferably from 8 parts by mass to 35 parts by mass.

Not specifically defined, the method of mixing the resol-type phenolic resin and the novolak-type resorcin resin for obtaining the resin composition in this embodiment may be any one in which the two components can be uniformly mixed and dispersed. For example, there may be mentioned a method of adding a novolak-type phenolic resin to a resol-type phenolic resin under reaction, and mixing them, a method of adding a resol-type phenolic resin to a novolak-type phenolic resin under reaction, and mixing them, or a method of simply grinding and mixing a resol-type phenolic resin and a novolak-type phenolic resin, as well as a method of kneading them in a double-screw extruder, an open roll or a pressure kneader, etc.

Preferably, the phenolic resin composition in this embodiment is powder or solid. When the resin composition is not powdery or solid, but semi-solid or liquid, it is unfavorable as causing a problem in that the handlability thereof in incorporation into shaped articles is poor.

The content of the phenolic resin composition in the rubber composition of this embodiment is preferably from 1 part by mass to 30 parts by mass relative to 100 parts by mass of the rubber component, more preferably from 5 parts by mass to 20 parts by mass. When the content falls within the range, a rubber composition having characteristics of high elasticity and large elongation at breakage can be obtained.

(Other Components)

In the rubber composition of this embodiment, various additives generally used in the field of rubber industry, such as filler, vulcanizing agent, vulcanization promoter, zinc oxide, stearic acid, antioxidant, softener and the like, may be optionally incorporated, as suitably selected within a range not detracting from the object of this embodiment, in addition to the rubber component and the resin composition therein mentioned above.

For example, the filler includes carbon black, silica, clay, talc, calcium carbonate, aluminium hydroxide, etc. The type of the filler is not specifically defined; and any one in common use as the filler for rubber may be used here, as suitably selected. From the viewpoint of securing high elongation at breakage and high strength at breakage, preferred is use of at least one of carbon black and silica as the filler. In case where an inorganic filler such as silica or the like is used, a silane-coupling agent may be used along with it.

In particular, in case where the rubber composition is used as the bead part of a tire, more preferred is use of carbon black as the filler from the viewpoint of enhancing the modulus of elasticity of the composition not detracting from the adhesiveness thereof to the cords.

The amount of the filler to be incorporated in the rubber composition of this embodiment is preferably from 20 parts by mass to 150 parts by mass relative to 100 parts by mass of the rubber component. When the amount falls within the range, the rubber composition can be fully reinforced, and preventing heat generation, the composition can sustain the physical properties such as abrasion resistance, workability and the like thereof. From the viewpoint of satisfying both the reinforcement and the rubber properties, the amount of the filler is more preferably from 30 parts by mass to 80 parts by mass.

In particular, in case where carbon black is used as the filler, its amount is preferably from 30 parts by mass to 100 parts by mass relative to 100 parts by mass of the rubber component, more preferably from 40 parts by mass to 80 parts by mass. When the amount of carbon black falls within the range, the modulus of elasticity of the rubber composition can be efficiently enhanced not detracting from the adhesiveness thereto to cords.

Not specifically defined, the vulcanization promoter includes, for example, thiazole-type vulcanization promoters such as M (2-mercaptobenzothiazole), DM (dibenzothiazyl disulfide, etc.; sulfenamide-type vulcanization promoters such as CZ (N-cyclohexyl-2-benzothiazylsulfenamide), etc; guanidine-type vulcanization promoters such as DPG (diphenylguanidine), etc.; and the amount thereof to be used is preferably from 0.1 parts by mass to 5.0 parts by mass relative to 100 parts by mass of the rubber composition, more preferably from 0.2 parts by mass to 3.0 parts by mass.

The antioxidant includes, for example, 3C (N-isopropyl-N'-phenyl-p-phenylenediamine), 6C [N-(1,3-dimethylbutyl)-N'-phenyl-p-phenylenediamine], AW (6-ethoxy-2,2,4-trimethyl-1,2-dihydroquinoline), high-temperature condensate of diphenylamine and acetone, etc. Its amount to be used is preferably from 0.1 parts by mass to 6.0 parts by mass relative to 100 parts by mass of the rubber component, more preferably from 0.3 parts by mass to 5.0 parts by mass.

The rubber composition of this embodiment may be produced, for example, by kneading the above-mentioned components with a kneading machine or the like such as roller, Banbury mixer, kneader, internal mixer, etc.

Comprising at least one rubber component selected from natural rubber, synthetic isoprene rubber and synthetic dienic rubber and containing a specific phenolic resin composition added thereto, the thus-designed rubber composition of this embodiment is excellent in workability and environmental sanitation, and the modulus of elasticity and the elongation at breakage of the rubber composition are much higher than those of conventional ones.

After kneaded with the above-mentioned kneading machine, the rubber composition of this embodiment may be shaped and vulcanized, and can be used typically in tires as the constitutive parts of tires such as tread rubber, undertread, carcass, sidewall, bead, etc.; as well as in other industrial products such as antivibration rubber, belt, hose, etc.

<Tire>

The tire of this embodiment comprises the above-mentioned rubber composition. Specifically, in the tire of this embodiment, the above-mentioned rubber composition is used in at least a part of the bead part of the tire. The rubber of the bead part in which the rubber composition is used includes, for example, bead filler rubber, bead coating rubber, etc.

In case where a pneumatic tire is produced as the tire of this embodiment, for example, there may be employed a method comprising producing a bead filler part or a side-reinforced rubber for run flat tire by an extruder and a calender, then sticking it to the other part on a shaping drum to give a green tire, setting the green tire in a tire mold, and vulcanizing it with pressuring from the inner side therein. In the inside thereof, the tire of this embodiment may be filled with nitrogen or inert gas in addition to air.

One preferred example of the pneumatic tire comprises a pair of bead parts, a carcass toroidally connecting with the bead parts a belt to hoop the crown part of the carcass and a tread. The pneumatic tire of this embodiment may have a radial structure or a bias structure.

The embodiment is described below with reference to the drawing. FIG. 1 is a left-half cross-sectional view of one example of the tire (pneumatic tire) of this embodiment.

In FIG. 1, the pneumatic radial tire 1R comprises a pair of bead parts (only the half is shown) 2, a pair of side wall parts 3 (only the half is shown) connecting to the bead parts 2, and a tread part 4 toroidally connecting to both side wall parts 3, in which a radial carcass 8 to be the rubber coating of at least 2-ply, for example, 6-ply in the illustrated case, radial-arrangement cord running between the bead cores 7 each one embedded in each bead part 2, reinforces the bead parts 2, the side wall parts 3 and the tread part 4. An organic fiber cord such as 6,6-nylon cord is suitable to the ply cord of the radial carcass 8.

The radial carcass 8 is suitably so designed as to comprise a turn-up ply $8_U$ having a wind-up part to wind up the periphery of the bead core 7 from the inside of the tire toward the outside thereof, and a down ply $8_D$ to externally envelop the turn-up ply $8_U$ including the wind-up part; and in the illustrated case, the radical carcass is designed to comprise a 4-ply turn-up ply $8_U$ and a 2-ply down ply $8_D$. The end part of the down ply $8_D$ is positioned inside the bead core 7 in the direction of the radius of the tire. The bead filler 6 formed of a hard rubber composition is between the turn-up ply $8_U$ and the turned-back end thereof and is positioned outside the bead core 7 in the direction of the radius of the tire.

In FIG. 1, a belt 9 is arranged around the outer periphery of the radial carcass 8, a relatively low-gauge tread rubber 10 is provided around the outer periphery of the tire 1R, and the tread rubber 10 and the side wall rubber 11 bond to each other at the bonding face P. The tread rubber 10 is provided with linear grooves 12, 13.

In the tire of this embodiment, the above-mentioned rubber composition is used in at least a part of the bead part 2, and especially preferably, the bead part 2 comprising the rubber composition is the bead filler 6. When used in the bead filler 6, the rubber composition can effectively exhibit the characteristics thereof of high adhesiveness to cords and high elasticity, and therefore effectively enhances the durability of the entire tire.

The tire of this embodiment thus obtained is further excellent in reinforcement, abrasion resistance, etc., and satisfies lightweight solution.

The present invention has been described above with reference to the embodiments thereof; however, not limited to the above embodiments, the present invention can be modified and changed in any desired manner within the range not overstepping the scope and the sprit of the present invention.

EXAMPLES

This embodiment is described in more detail with reference to the following Examples; however, this embodiment is not limited to these Examples.

<Production of Phenolic Resin>

(Resol-Type Phenolic Resin A)

1000 parts by mass of phenol and 1294 parts by mass of aqueous 37% formaldehyde solution (molar ratio (formaldehyde/phenol)=1.50) were put into a reactor equipped with a stirrer, a reflux condenser and a thermometer, and 5 parts by mass of zinc acetate was added thereto. After reflux for 1 hour, water formed through the reaction was vacuum-removed, and at the time at 90° C., this was further reacted for 1 hour to give 1145 parts by mass of a resol-type phenolic resin A solid at room temperature (25° C.).

The resol-type phenolic resin A was analyzed through 1H-NMR under the above-mentioned condition, in which the content of the dimethylene ether group relative to the content of the total bonding groups derived from the aldehyde was 45 mol %.

(Resol-Type Phenolic Resin B)

1115 parts by mass of a resol-type phenolic resin B solid at room temperature was produced according to the same reaction as that for the resol-type phenolic resin A, except that in production of the resol-type phenolic resin A, the amount of the aqueous 37% formaldehyde solution was changed to 1121 parts by mass (molar ratio=1.30).

The resol-type phenolic resin B was analyzed through 1H-NMR under the above-mentioned condition, in which the content of the dimethylene ether group was 35 mol %.

(Resol-Type Phenolic Resin C)

1180 parts by mass of a resol-type phenolic resin C solid at room temperature was produced according to the same reaction as that for the resol-type phenolic resin A, except that in production of the resol-type phenolic resin A, the amount of the aqueous 37% formaldehyde solution was changed to 1553 parts by mass (molar ratio=1.80).

The resol-type phenolic resin C was analyzed through 1H-NMR under the above-mentioned condition, in which the content of the dimethylene ether group was 60 mol %.

(Resol-Type Phenolic Resin D)

1180 parts by mass of a resol-type phenolic resin D solid at room temperature was produced according to the same reaction as that for the resol-type phenolic resin A, except that in production of the resol-type phenolic resin A, the amount of the aqueous 37% formaldehyde solution was changed to 1121 parts by mass (molar ratio=1.30) and the 5 parts by mass of zinc acetate was changed to 70 parts by mass of aqueous 25% sodium hydroxide solution. However, while taken out, a part of the resin gelled.

The resol-type phenolic resin D was analyzed through 1H-NMR under the above-mentioned condition, in which the content of the dimethylene ether group was 10 mol %.

(Novolak-Type Resorcin Resin)

1000 parts by mass of resorcin and 3 parts by mass of oxalic acid were put into a reactor equipped with a stirrer, a reflux condenser and a thermometer. This was heated until the inner temperature thereof could be 100° C., and after reached the temperature, 369 parts of aqueous 37% formaldehyde solution was gradually added thereto taking 30 minutes (molar ratio (formaldehyde/phenol)=0.50). Afterwards, this was refluxed for 1 hour, and water formed through the reaction was removed under normal pressure and in vacuum until the system could reach 170° C., thereby giving 1040 parts by mass of a novolak-type resorcin resin solid at room temperature.

<Production of Resin Composition>

The novolak-type resorcin resin and the resol-type phenolic resin obtained in the above were mixed in the combination and the composition shown in Table 1, and ground with an impact mill to give powdery resin compositions (1) to (3) and (5) to (7). 5.0 parts by mass of fumed silica (Nippon Aerosil's trade name, "AEROSIL R972" was added to 100 parts by mass of the resin composition (1) to prepare a resin composition (4).

TABLE 1

|  | Novolak-type | Resol-type | Blend Ratio by weight (novolak-type/ resol-type) |
|---|---|---|---|
| Resin Composition (1) | novolak-type resorcin resin | resol-type phenolic resin A | 30/70 |
| Resin Composition (2) | novolak-type resorcin resin | resol-type phenolic resin A | 40/60 |
| Resin Composition (3) | novolak-type resorcin resin | resol-type phenolic resin A | 20/80 |
| Resin Composition (5) | novolak-type resorcin resin | resol-type phenolic resin B | 30/70 |
| Resin Composition (6) | novolak-type resorcin resin | resol-type phenolic resin C | 30/70 |
| Resin Composition (7) | novolak-type resorcin resin | resol-type phenolic resin D | 30/70 |

<Evaluation of Various Properties>

(Rubber Properties)

(1) Elongation at Breakage and Strength at Breakage:

The obtained vulcanized rubber was blanked to give samples of JIS dumbbell shape No. 3; and according to JIS-K6251, the samples were tested in a tensile test at 25° C. to determine the elongation at breakage thereof and the strength at breakage thereof. The results are shown in Table 2.

(2) Modulus of Dynamic Elasticity E':

Using a spectrometer by Toyo Seiki, the obtained vulcanized rubber was analyzed for the modulus of dynamic elasticity E' and the loss tangent tan δ thereof under an initial load of 100 g, and at a strain of 2%, a test frequency of 50 Hz and a test temperature of 25° C. and 60° C. The results are shown in Table 2.

(Tire Performance)

(1) Confirmation of Formaldehyde Gas Generation:

The presence or absence of formaldehyde gas generation in vulcanization in producing the sample tires of Examples and Comparative Examples was confirmed, using a gas detector (Gastec's No. 91 and No. 91LL).

(2) Peeling Resistance:

The tires produced in Examples and Comparative Examples were tested in a T-type peeling test according to JIS-K6854 to thereby determine the peeling resistance thereof between the ply cord and the ply coating rubber. The results are shown in indexation based on the peeling resistance, 100, of the tire of Comparative Example 1.

(3) Run Flat Durability:

The test tire mentioned below was rimmed and tested for drum running under the condition mentioned below.

Test Tire: tire size 285/50R20

Rim: 6JJ×20

Inner Pressure: 0 kpa

Load: 9.8 kN

Speed: 90 km/h

In the above-mentioned durability drum test, the endurance running distance was measured before breakdown, and the results were shown through indexation according to the formula mentioned below. The tires having a larger index have better run flat durability.

Run Flat Durability (index)=(running distance of test tire/running distance of tire of Comparative Example 1)×100

(4) Presence or Absence of Interfacial Peeling:

After the above-mentioned run-flat drum running test, the tire was visually checked for the presence or absence of interfacial peeling in the ply coating rubber part thereof.

Examples 1 to 11, Comparative Examples 1 to 8

The mixture formulated as in the following Table 2 and Table 3 was kneaded with a Banbury mixer to prepare an unvulcanized rubber composition, formed into a sheet having a thickness of 2 mm, and vulcanized at 145° C. for 30 minutes. The obtained vulcanized rubber was tested for the rubber properties thereof according to the methods mentioned above.

Next, radial tires (tire size: 255/55R18) comprising, as the bead filler thereof, any of the 19 types of the rubber compositions prepared in the above were produced according to an ordinary method, and tested for the tire performance. The results are collectively shown in Table 2 and Table 3.

TABLE 2

| | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Formulation (part by mass) | Natural Rubber | 100 | 100 | 100 | 100 | 100 | 100 | 100 | 100 | 100 | 100 | 100 |
| | Carbon Black[1] | 50 | 50 | 50 | 25 | 110 | 50 | 50 | 50 | 50 | 50 | 50 |
| | Stearic Acid | 2 | 2 | 2 | 2 | 2 | 2 | 2 | 2 | 2 | 2 | 2 |
| | Antioxidant[2] | 1 | 1 | 1 | 1 | 1 | 1 | 1 | 1 | 1 | 1 | 1 |
| | Resin Composition (upper: type, lower: part by mass) | (1) 14 | (1) 12 | (1) 8 | (1) 14 | (1) 14 | (2) 14 | (3) 14 | (4) 14 | (1) 35 | (5) 14 | (6) 14 |
| | Zinc Oxide | 4 | 4 | 4 | 4 | 4 | 4 | 4 | 4 | 4 | 4 | 4 |
| | Vulcanization Promoter[3] | 3 | 3 | 3 | 3 | 3 | 3 | 3 | 3 | 3 | 3 | 3 |
| | Sulfur[4] | 5.6 | 5.6 | 5.6 | 5.6 | 5.6 | 5.6 | 5.6 | 5.6 | 5.6 | 5.6 | 5.6 |
| Rubber Properties | Elongation at Breakage (%) | 259 | 210 | 210 | 330 | 132 | 268 | 266 | 267 | 114 | 256 | 261 |
| | Strength at Breakage (MPa) | 16.6 | 14.6 | 15.3 | 15.8 | 10.3 | 16.6 | 15.7 | 16.2 | 9.4 | 14.5 | 16.4 |
| | Modulus of Dynamic Elasticity, E'(MPa) 25° C. | 49.9 | 23.8 | 17.1 | 16.3 | 121.3 | 28.4 | 39.8 | 31.4 | 131.5 | 41.0 | 48.3 |
| | tanδ 25° C. | 0.163 | 0.153 | 0.158 | 0.154 | 0.251 | 0.166 | 0.162 | 0.165 | 0.273 | 0.185 | 0.175 |
| | Modulus of Dynamic Elasticity, E'(MPa) 60° C. | 41.7 | 20.7 | 15.3 | 14.6 | 104.3 | 23.6 | 31.2 | 30.5 | 120.6 | 34.6 | 37.1 |
| | tanδ 60° C. | 0.161 | 0.127 | 0.125 | 0.126 | 0.232 | 0.164 | 0.171 | 0.167 | 0.269 | 0.174 | 0.176 |
| Tire Performance | Peeling Resistance (index) | 101 | 100 | 101 | 100 | 100 | 100 | 100 | 100 | 101 | 100 | 103 |
| | Run Flat Durability (index) | 120 | 111 | 108 | 105 | 103 | 109 | 110 | 110 | 101 | 108 | 111 |
| | Formaldehyde Generation | no | no | no | no | no | no | no | no | no | no | no |
| | Interfacial Peeling | no | no | no | no | no | no | no | no | no | no | no |

[Notes]
[1] Carbon Black: Asahi Carbon's ASAHI #70 (N330)
[2] Antioxidant: N-(1,3-dimethylbutyl)-N'-phenyl-p-phenylenediamine, Ouchi Shinko Chemical's trade name "Noclac 6C"
[3] Vulcanization Promoter: N-cyclohexyl-2-benzothiazylsulfenamide, Ouchi Shinko Chemical's trade name "Nocceler-CZ"
[4] Sulfur: Flexsys's trade name "CRYSTEX HS OT 10"

TABLE 3

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Formulation (part by mass) | Natural Rubber | 100 | 100 | 100 | 100 | 100 | 100 | 100 | 100 |
| | Carbon Black[1] | 50 | 60 | 80 | 60 | 50 | 50 | 50 | 50 |
| | Stearic Acid | 2 | 2 | 2 | 2 | 2 | 2 | 2 | 2 |
| | Antioxidant[2] | 1 | 1 | 1 | 1 | 1 | 1 | 1 | 1 |
| | Phenolic Resin A[3] | — | — | — | — | 14 | 14 | — | — |
| | Phenolic Resin B[4] | — | — | — | — | — | — | 14 | — |
| | Resin Composition (7) | — | — | — | — | — | — | — | 14 |
| | Zinc Oxide | 4 | 4 | 4 | 4 | 4 | 4 | 4 | 4 |
| | Hexamethylenetetramine[5] | — | — | — | — | 3 | — | — | — |
| | Hexamethoxymethylmelamine[6] | — | — | — | — | — | 7 | — | — |
| | Vulcanization Promoter[7] | 3 | 3 | 3 | 3.6 | 3 | 3 | 3 | 3 |
| | Sulfur[8] | 5.6 | 5.6 | 5.6 | 6.7 | 5.6 | 5.6 | 5.6 | 5.6 |
| Rubber Properties | Elongation at Breakage (%) | 187 | 157 | 109 | 121 | 145 | 230 | 273 | 248 |
| | Strength at Breakage (MPa) | 15.2 | 15.8 | 16.7 | 14.4 | 13.7 | 14.9 | 15.2 | 9.2 |
| | Modulus of Dynamic Elasticity, E'(MPa) 25° C. | 11.7 | 16.2 | 24.1 | 18.8 | 30.0 | 43.0 | 49.1 | 17.2 |
| | tanδ 25° C. | 0.160 | 0.188 | 0.241 | 0.196 | 0.177 | 0.191 | 0.221 | 0.244 |
| | Modulus of Dynamic Elasticity, E'(MPa) 60° C. | 10.7 | 13.8 | 20.3 | 16.3 | 26.7 | 36.6 | 35.4 | 16.7 |
| | tanδ 60° C. | 0.118 | 0.137 | 0.176 | 0.147 | 0.151 | 0.173 | 0.244 | 0.199 |
| Tire Performance | Peeling Resistance (index) | 100 | 101 | 100 | 105 | 90 | 100 | 86 | 88 |
| | Run Flat Durability (index) | 100 | 101 | 102 | 104 | 88 | 110 | 85 | 82 |
| | Formaldehyde Generation | no | no | no | no | no | yes | no | no |
| | Interfacial Peeling | no | no | no | no | no | no | no | no |

[Notes]
[1] Carbon Black: Asahi Carbon's ASAHI #70 (N330)
[2] Antioxidant: N-(1,3-dimethylbutyl)-N'-phenyl-p-phenylenediamine, Ouchi Shinko Chemical's trade name "Noclac 6C"
[3] Novolak-type phenol-formaldehyde resin: Sumitomo Bakelite's trade name "PR50731"
[4] Resol-type phenolic resin produced in this Example
[5] Ouchi Shinko Chemical's Nocceler-H
[6] Cytec's CYREZ964 (hexamethoxymethylmelamine 65%, silica 35%)
[7] Vulcanization Promoter: N-cyclohexyl-2-benzothiazylsulfenamide, Ouchi Shinko Chemical's trade name "Nocceler-CZ"
[8] Sulfur: Flexsys's trade name "CRYSTEX HS OT 10"

As obvious from the results shown in Table 2 and Table 3, the rubber compositions of Examples, each containing a specific resin composition, had an increased modulus of dynamic elasticity E' and low heat generation, as compared with Comparative Examples 1 to 4 having the same composition as examples of the inventions except for containing no phenolic resin and in addition, since the elongation at breakage thereof was large, the rubber compositions confirmed the enhancement of the run flat durability of the tires comprising the composition.

On the other hand, in Comparative Example 5 where a novolak-type phenolic resin and hexamethylenetetramine were incorporated as usual, the modulus of dynamic elasticity E' increased but the elongation at breakage lowered. It was confirmed that the formulation lowered the adhesiveness (peeling resistance) between rubber and cords in vulcanization of tires, and the run flat durability of tires lowered. In Comparative Example 6 where a novolak-type phenolic resin and hexamethoxymethylmelamine were incorporated, the modulus of dynamic elasticity E' and the elongation at breakage both increased and the run flat durability of tires bettered; however, in kneading the rubber composition, formaldehyde gas was generated. Further, in Comparative Example 7 where only a resol-type phenolic resin was incorporated, the modulus of elasticity and the elongation at breakage were high; however, especially at high temperature, tan δ increased owing to insufficient curing of the resin, and rubber compositions satisfying all the requirements could not be obtained.

The invention claimed is:

1. A rubber composition comprising a rubber component of at least one of natural rubber and synthetic rubber, and a resin composition containing a novolak-type resorcin resin and a resol-type phenolic resin,
    wherein the content of the dimethylene ether group in the resol-type phenolic resin is from 20 mol % to 100 mol % relative to the content of the total bonding groups derived from the aldehydes that bond the phenol-derived aromatic rings to each other, and
    wherein the content of the resin composition is from 1 part by mass to 30 parts by mass relative to 100 parts by mass of the rubber component.

2. The rubber composition according to claim 1, wherein the novolak-type resorcin resin is prepared by reacting a resorcin and an aldehyde in a molar ratio (aldehyde/resorcin) of from 0.4 to 0.8.

3. The rubber composition according to claim 1, wherein the content of the novolak-type resorcin resin in the resin composition is from 18% by mass to 50% by mass.

4. The rubber composition according to claim 1, wherein the resin composition previously contains a filler.

5. The rubber composition according to claim 4, wherein the content of the filler is from 1 part by mass to 100 parts by mass relative to 100 parts by mass of the resin composition.

6. The rubber composition according to claim 4, wherein the filler is fumed silica.

7. The rubber composition according to claim 1, wherein the rubber component is a dienic rubber.

8. A tire comprising a rubber composition in at least a part of the bead part,
    wherein the rubber composition is the rubber composition of claim 1.

9. The tire according to claim 8, wherein the bead part comprising the rubber composition is a bead filler.

10. The tire according to claim 8, wherein the rubber composition contains carbon black and the carbon black content is from 30 parts by mass to 100 parts by mass relative to 100 parts by mass of the rubber component.

* * * * *